(12) United States Patent
Minamiura et al.

(10) Patent No.: US 6,459,238 B2
(45) Date of Patent: Oct. 1, 2002

(54) METHOD FOR CHARGING A BATTERY PACK INCLUDING A PLURALITY OF BATTERY UNITS

(75) Inventors: Keiichi Minamiura, Toyohashi (JP); Toshiaki Nakanishi, Toyohashi (JP); Kiwamu Inui, Toyohashi (JP); Yoshiaki Kikuchi, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/844,022

(22) Filed: Apr. 27, 2001

(30) Foreign Application Priority Data

Apr. 28, 2000 (JP) ........................................ 2000-131741

(51) Int. Cl.[7] .............................................. H01M 10/44
(52) U.S. Cl. ........................ 320/125; 320/147; 320/160
(58) Field of Search ................................ 320/124, 125, 320/127, 128, 132, 135, 136, 147, 150, 149, 160, FOR 145, DIG. 17

(56) References Cited

U.S. PATENT DOCUMENTS 4,661,759 A * 4/1987 Klein
4,689,544 A * 8/1987 Stadnick et al.
5,126,649 A * 6/1992 Osanai
5,650,711 A * 7/1997 Kang

* cited by examiner

*Primary Examiner*—Edward H. Tso
(74) *Attorney, Agent, or Firm*—Michael K. Kelly; Snell & Wilmer, LLP (57) ABSTRACT

A method for charging a battery pack including a plurality of battery units includes: a first step of charging the battery units with a first electric current at a first rate until an internal pressure of at least one of the plurality of battery units begins to increase; and a second step of charging/discharging the battery units with a second electric current which is lower than the first electric current at a second rate which is lower than the first rate after the internal pressure of the at least one of the plurality of battery units has begun to increase.

9 Claims, 9 Drawing Sheets

Internal pressure characteristic of battery

FIG. 9

Pressure endurance characteristic of container

FIG. 10

Process for preventing increase in internal pressure

METHOD FOR CHARGING A BATTERY PACK INCLUDING A PLURALITY OF BATTERY UNITS

BACKGROUND OF THE INVENTION

1. Field of the Invention

The present invention relates to a method for charging a battery pack used as a power supply for an electric motor of a hybrid vehicle, or the like, which uses both an electric motor and an internal combustion engine together as an actuator of the vehicle.

2. Description of the Related Art

In a hybrid vehicle which uses both an electric motor and an internal combustion engine together as an actuator of the vehicle, a battery pack including a plurality of battery units is used as a power supply for the electric motor. Such a battery pack needs to be contained in a limited space in the vehicle, and therefore, it is necessary to decrease the size and weight of the battery pack. To this end, a thin, plane square-shaped battery unit has been developed. This square-shaped battery unit is formed by thin and hollow rectangular parallelepiped container made of plastic which contains electrolyte and an electrode plate group immersed in the electrolyte in the container. Furthermore, this battery unit has a safety vent for regulating the pressure in the battery unit.

When the internal pressure of the battery unit begins to increase, the safety vent is activated for releasing the pressure in the container. However, when the internal pressure of the battery unit further increases after the safety vent has been activated, the container may be damaged because it is made of plastic.

For example, the internal pressure of the battery unit increases when the battery unit is overcharged/overdischarged, or when the gas absorption capacity of the battery unit is decreased due to low temperature.

Further, in a hybrid vehicle, the temperature, voltage, current, etc., are measured for each of the battery units which form the battery pack so as to estimate the remaining battery capacity (SOC: State Of Charge) of the battery unit; based on the estimated value of the remaining battery capacity, the amount of electric power which can be added into/extracted from the battery pack (i.e., a chargeable/dischargeable range of the battery pack) is calculated: and the battery pack is used such that the electric power is added into/extracted from the battery pack within the chargeable/dischargeable range of the battery pack. In such a control system, for example, charging/discharging of the battery pack is restricted according to the battery temperature, the remaining battery capacity, etc. So long as use of the battery pack is restricted within the chargeable/dischargeable range of the battery pack, it is possible to eliminate the possibility of the supply of electric power from the battery pack suddenly stopping due to a decrease in the remaining battery capacity (SOC), etc. Thus, improved power performance of the hybrid motor vehicle can be achieved. For example, an uncomfortable feeling of a driver of the vehicle can be eliminated, and the drivable distance of the vehicle can be extended.

In the case where a battery pack including a plurality of battery units is used as a power supply for a hybrid vehicle, an electric current is consumed, i.e., the battery pack is discharged while the vehicle is running, whereby the amount of storage in the battery pack is decreased. When electric power is extracted from the battery pack, the electric power is not extracted equally from the respective battery units. That is, after the electric current has been consumed, the amount of storage differs among the respective battery units. The battery pack with decreased electric power is charged with a constant current such that the respective battery units are uniformly charged so as to supposedly have the same amount of storage. In this uniform charging process, the battery pack is charged with a constant current so that each of the battery units is overcharged.

The internal pressure of the battery unit which is being charged begins to linearly increase at the time around when or immediately after the full charge point is reached. When the uniform charging is performed on the battery pack, each of the battery units is overcharged such that the internal pressure of each battery unit increases to a level at which a safety vent is activated for preventing an increase in the internal pressure of each battery unit. Further, when charging is continued, the internal pressure may increase to a level at which the pressure endurance limit of the container is reached. Specifically, in a square-shaped battery made of plastic, there is a high possibility that an increase in the internal pressure of the battery unit causes the pressure endurance limit of the container to be reached.

In a conventional battery pack, the input/output electric power (the electric power which is added into/extracted from the battery pack) is calculated by estimating the remaining battery capacity (SOC). However, in this calculation process, the increase in the internal pressure of the battery pack is not considered. Thus, whether or not the internal pressure of the battery pack is increased cannot be determined by only estimating the remaining battery capacity (SOC). As a result, an increase in the internal pressure may cause the pressure endurance limit of the container to be reached.

SUMMARY OF THE INVENTION

According to one aspect of the present invention, a method for charging a battery pack including a plurality of battery units includes: a first step of charging the battery units with a first electric current at a first rate until an internal pressure of at least one of the plurality of battery units begins to increase; and a second step of charging/discharging the battery units with a second electric current which is lower than the first electric current at a second rate which is lower than the first rate after the internal pressure of the at least one of the plurality of battery units has begun to increase.

In one embodiment of the present invention, the second step includes steps of: charging the battery units; and suspending the charging/discharging of the battery units.

In another embodiment of the present invention, the second step includes steps of: charging the battery units; and discharging the battery units.

In still another embodiment of the present invention, the second step includes steps of: charging the battery units; discharging the battery units; and suspending the charging/discharging of the battery units.

In still another embodiment of the present invention, the first rate is 1.6–3.0 C, and the second rate is 0.3–1.5 C.

According to another aspect of the present invention, a method for preventing an increase in an internal pressure of a battery pack including a plurality of battery units includes steps of: detecting a temperature of at least one of the battery units; estimating an internal pressure of the at least one of the battery units; determining, based on the detected temperature of the at least one of the battery units and the estimated internal pressure of the at least one of the battery units, whether or not there is a possibility that a container of the battery unit will reach a pressure endurance limit thereof; and restricting charging/discharging of the battery pack by performing the second step recited in claim 1 when it is determined that there is a possibility that the container reaches the pressure endurance limit thereof.

In one embodiment of the present invention, the determination of whether or not there is a possibility that the container will reach the pressure endurance limit thereof is performed using a map which represents the pressure endurance limit which has been previously determined.

In still another embodiment of the present invention, the estimation of the internal pressure of the at least one of the battery units is performed based on a remaining battery capacity (SOC) of the at least one of the battery units, the temperature of the at least one of the battery units, and an amount of charged/discharged electric current to/from the at least one of the battery units.

In still another embodiment of the present invention, the remaining battery capacity (SOC) of the at least one of the battery units is calculated based on a voltage of the at least one of the battery units, the amount of charged/discharged electric current to/from the at least one of the battery units, and the temperature of the at least one of the battery units.

Thus, the invention described herein makes possible the advantages of (1) providing a method for charging a battery pack which effectively prevents the container from expanding or reaching the pressure endurance limit thereof when battery units included in the battery pack are overcharged in a uniform charging process; and (2) providing a method for preventing an increase in the internal pressure of the battery pack by which the container is prevented from reaching the pressure endurance limit thereof.

These and other advantages of the present invention will become apparent to those skilled in the art upon reading and understanding the following detailed description with reference to the accompanying figures.

BRIEF DESCRIPTION OF THE DRAWINGS

Part (a) of FIG. 1 is a graph illustrating a method for charging a battery pack according to the present invention. Part (b) of FIG. 1 is a graph illustrating the internal pressure of a battery unit included in the battery pack charged by the method shown in part (a).

Part (a) of FIG. 2 is a graph illustrating a method for charging a battery pack according to the present invention. Part (b) of FIG. 2 is a graph illustrating the internal pressure of a battery unit included in the battery pack charged by the method shown in part (a).

Part (a) of FIG. 3 is a graph illustrating a method for charging a battery pack according to the present invention. Part (b) of FIG. 3 is a graph illustrating the internal pressure of a battery unit included in the battery pack charged by the method shown in part (a).

Part (a) of FIG. 4 is a graph illustrating a method for charging a battery pack according to the present invention. Part (b) of FIG. 4 is a graph illustrating the internal pressure of a battery unit included in the battery pack charged by the method shown in part (a).

Part (a) of FIG. 5 is a graph illustrating a method for charging a battery pack according to the present invention. Part (b) of FIG. 5 is a graph illustrating the internal pressure of a battery unit included in the battery pack charged by the method shown in part (a).

Part (a) of FIG. 6 is a graph illustrating a method for charging a battery pack according to the present invention.

Part (b) of FIG. 6 is a graph illustrating the internal pressure of a battery unit included in the battery pack charged by the method shown in part (a).

DESCRIPTION OF THE PREFERRED EMBODIMENTS

Hereinafter, embodiments of the present invention will be described with reference to the drawings. In the present specification, the term "rate" means a "charging rate" or a "discharging rate". The term "battery unit" means a "battery cell" or a "unit battery formed by a single battery case having a pair of positive and negative terminals on its exterior and a plurality of battery cells contained within the battery case".

Figure 1:
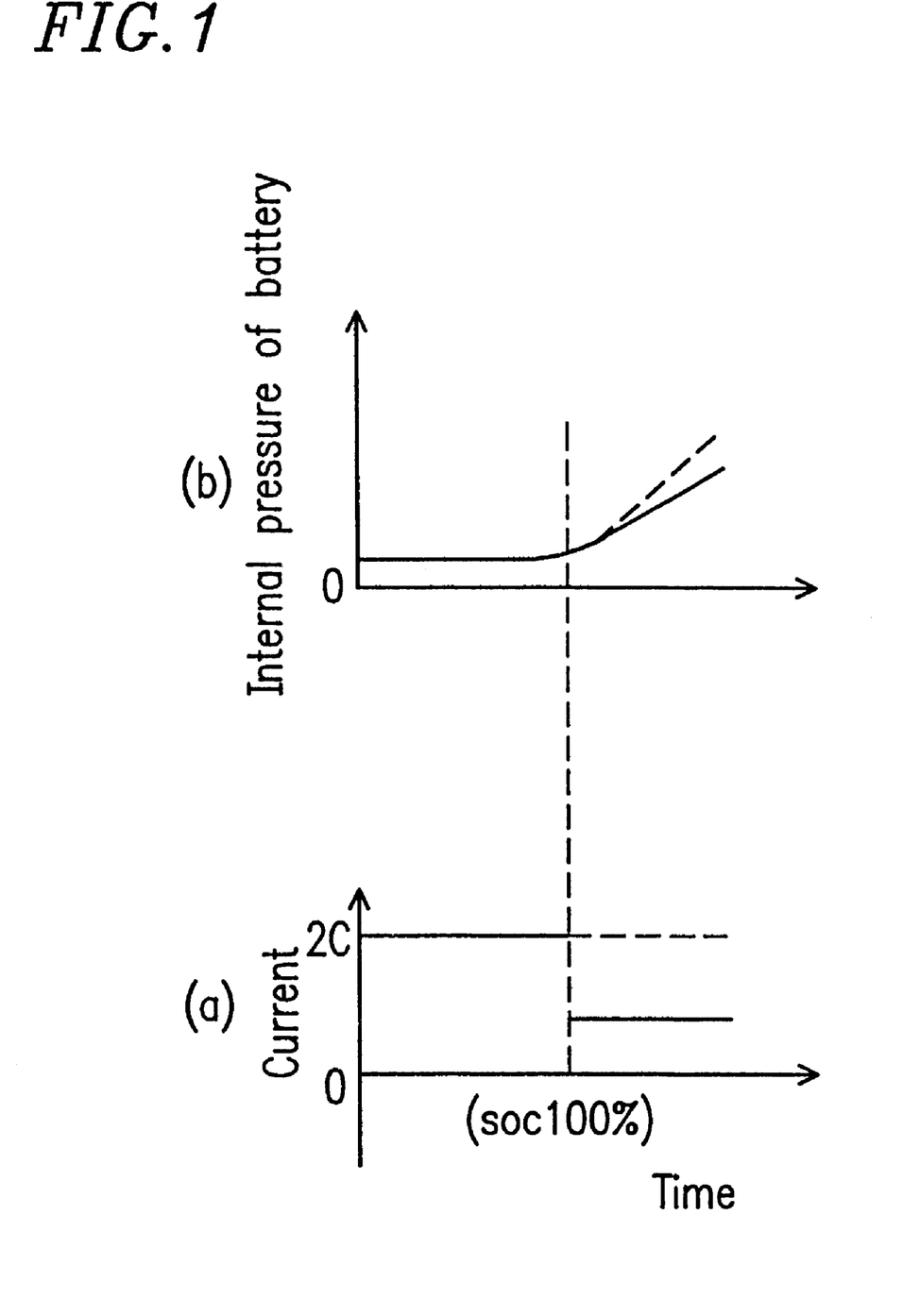

A method for preventing an increase in the internal pressure of a battery pack according to the present invention is employed, for example, in the case of uniformly charging a battery pack including sealed nickel-hydrogen storage cells which is used as a power supply for an electric motor of a hybrid vehicle. This uniform charging method is described with reference to the graphs shown in FIG. 1.

When a battery pack is subjected to a uniform charging process, as a first step, the battery pack is charged with a constant current at a rate of about 2 C until each of the battery units included in the battery pack reaches the remaining battery capacity (SOC) of 100% as shown by the solid line in part (a) of FIG. 1. In general, charging at a rate of about 2 C is performed for about 30 minutes. After the SOC reaches 100%, charging is continued for about another 40 minutes at a relatively low rate of about 0.3–1.5 C.

In this case, the internal pressure of each battery unit is substantially constant until the SOC reaches 100% as shown by the solid line in part (b) of FIG. 1. After the SOC has reached 100%, the internal pressure begins to increase. In this example, a charging rate is decreased from about 2 C to a low rate of about 0.3–1.5 C after the SOC has reached 100%. Thus, the internal pressure of each battery unit only increases slowly. For comparison, an increase of the internal pressure when the battery pack is charged with only a constant current at a rate of 2 C is shown by the broken line in part (b) of FIG. 1.

Figure 2:
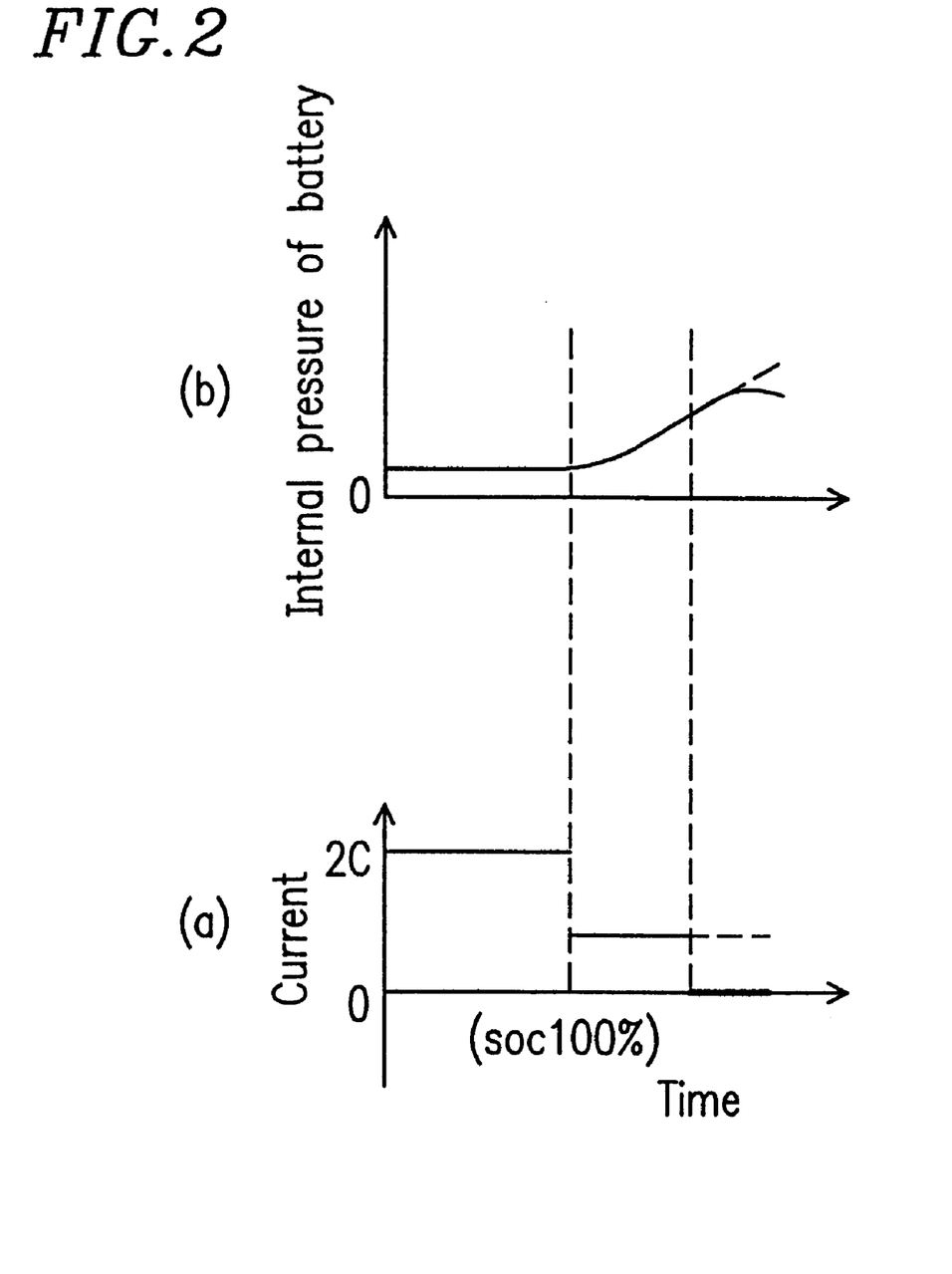

Alternatively, according to the present invention, for the purpose of surely preventing an increase in the internal pressure of each battery unit after the SOC has exceeded 100%, the charging of the battery pack at a rate of about 0.3–1.5 C may be stopped after a predetermined time period has elapsed as shown by the solid line in part (a) of FIG. 2. With such an arrangement, the possibility that the internal pressure of each battery unit increases after the charging has been stopped is eliminated as shown by the solid line in part (b) of FIG. 2.

Figure 3:
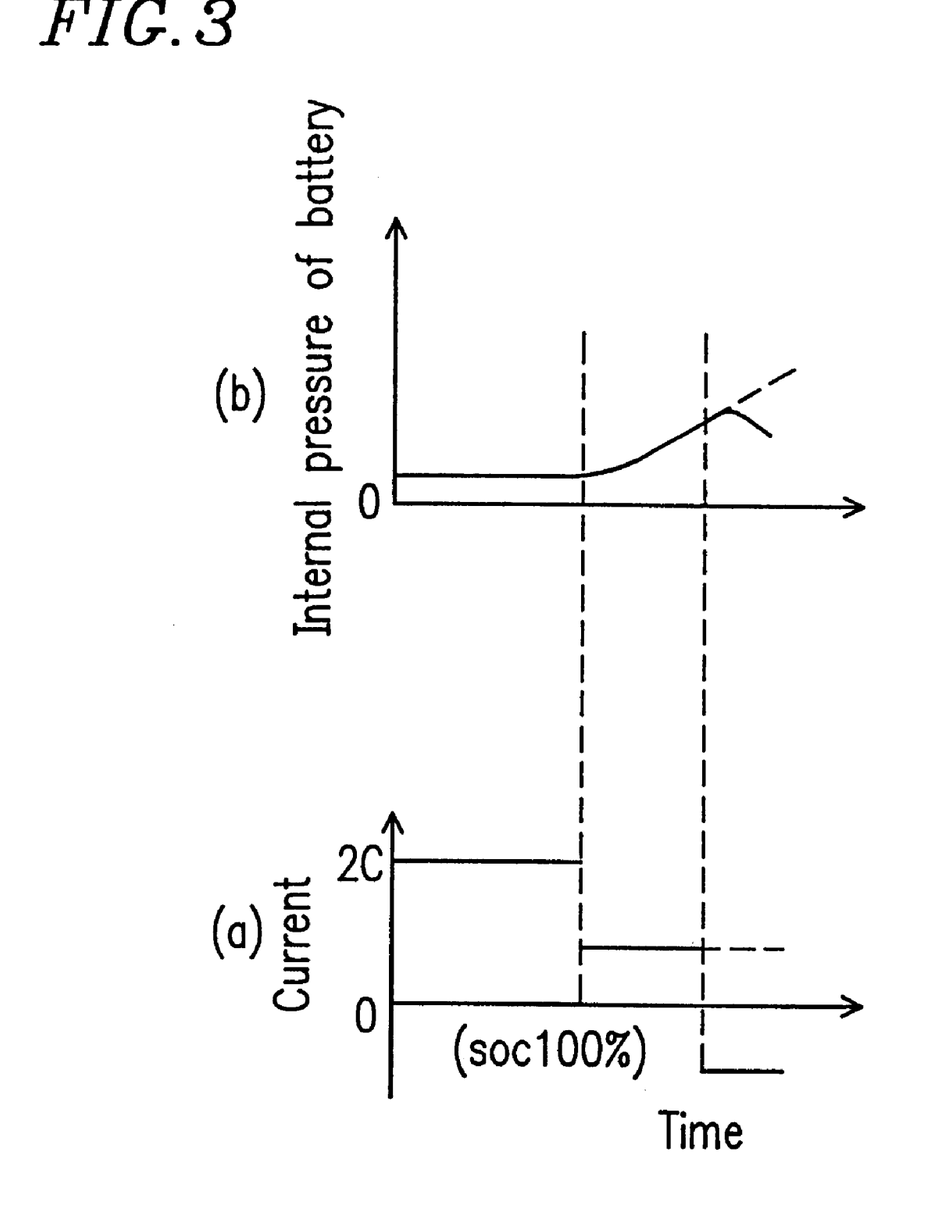

Alternatively, according to the present invention, for the purpose of reducing the internal pressure of each battery unit after the SOC has exceeded 100%, each battery unit may be discharged after the charging of the battery pack at a rate of about 0.3–1.5 C is performed for a predetermined time period as shown by the solid line in part (a) of FIG. 3. With such an arrangement, the internal pressure of each battery unit decreases after the discharging has been started as shown by the solid line in part (b) of FIG. 3.

Figure 4:
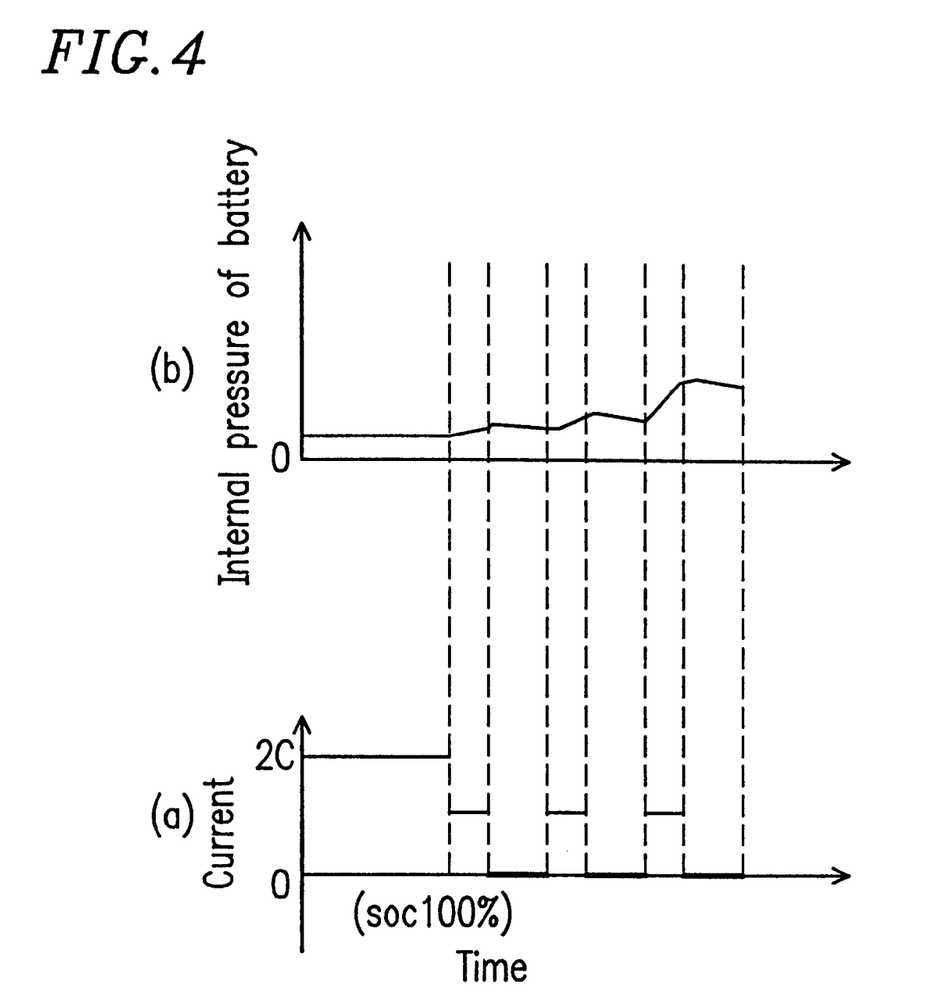

Alternatively, according to the present invention, after the battery pack is charged with a constant current at a rate of 2 C until the remaining battery capacity (SOC) reaches 100%, charging at a low rate of about 0.3–1.5 C and a suspension of charging may be alternately repeated as shown in part (a) of FIG. 4. The charging at a low rate and the suspension of charging are each performed for an appropriate time period of about 10 seconds to about 40 minutes. In this case, after the SOC has exceeded 100%, the internal pressure of each battery unit is only increased slowly by the charging at a low rate of about 0.3–1.5 C as shown in part (b) of FIG. 4. Moreover, the internal pressure of each battery unit decreases during the suspension of charging. Thus, by alternately repeating the charging at a low rate of about 0.3–1.5 C and the suspension of charging, an increase in the internal pressure of each battery unit is surely prevented.

Figure 5:
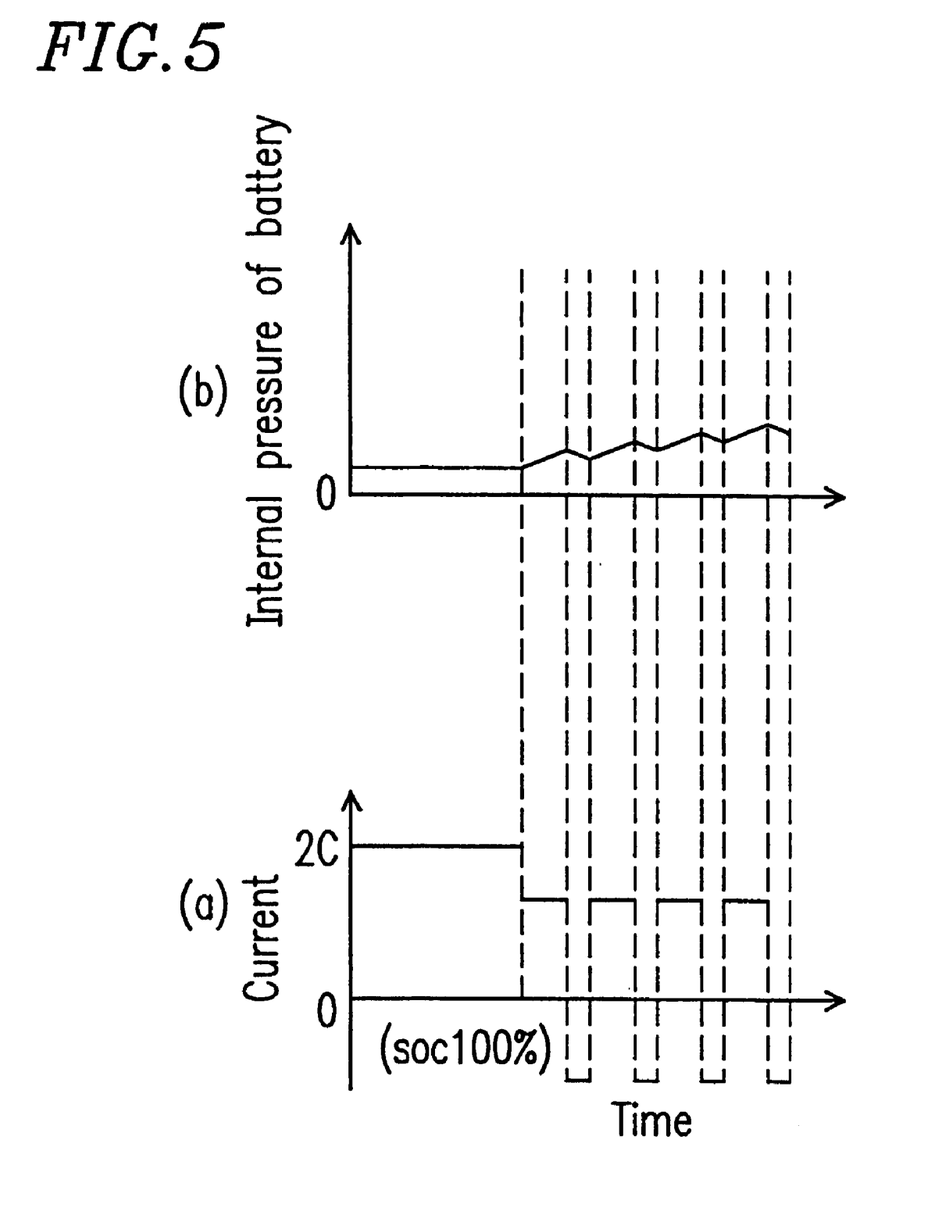

Alternatively, according to the present invention, after the battery pack is charged with a constant current at a rate of 2 C until the remaining battery capacity (SOC) reaches 100%, charging at a low rate of about 0.3–1.5 C and discharging of the battery pack may be alternately repeated as shown in part (a) of FIG. 5. The charging at a low rate and the discharging of the battery pack are each performed for an appropriate time period of about 10 seconds to about 40 minutes. Naturally, the charging time should be set so as to be longer than the discharging time. In this case, after the SOC has exceeded 100%, the internal pressure of each battery unit is only increased slowly by the charging at a low rate of about 0.3–1.5 C as shown in part (b) of FIG. 5. Moreover, the internal pressure of each battery unit is surely reduced by discharging. Thus, by alternately repeating the charging at a low rate of about 0.3–1.5 C and the discharging, an increase in the internal pressure of each battery unit is surely prevented.

Figure 6:
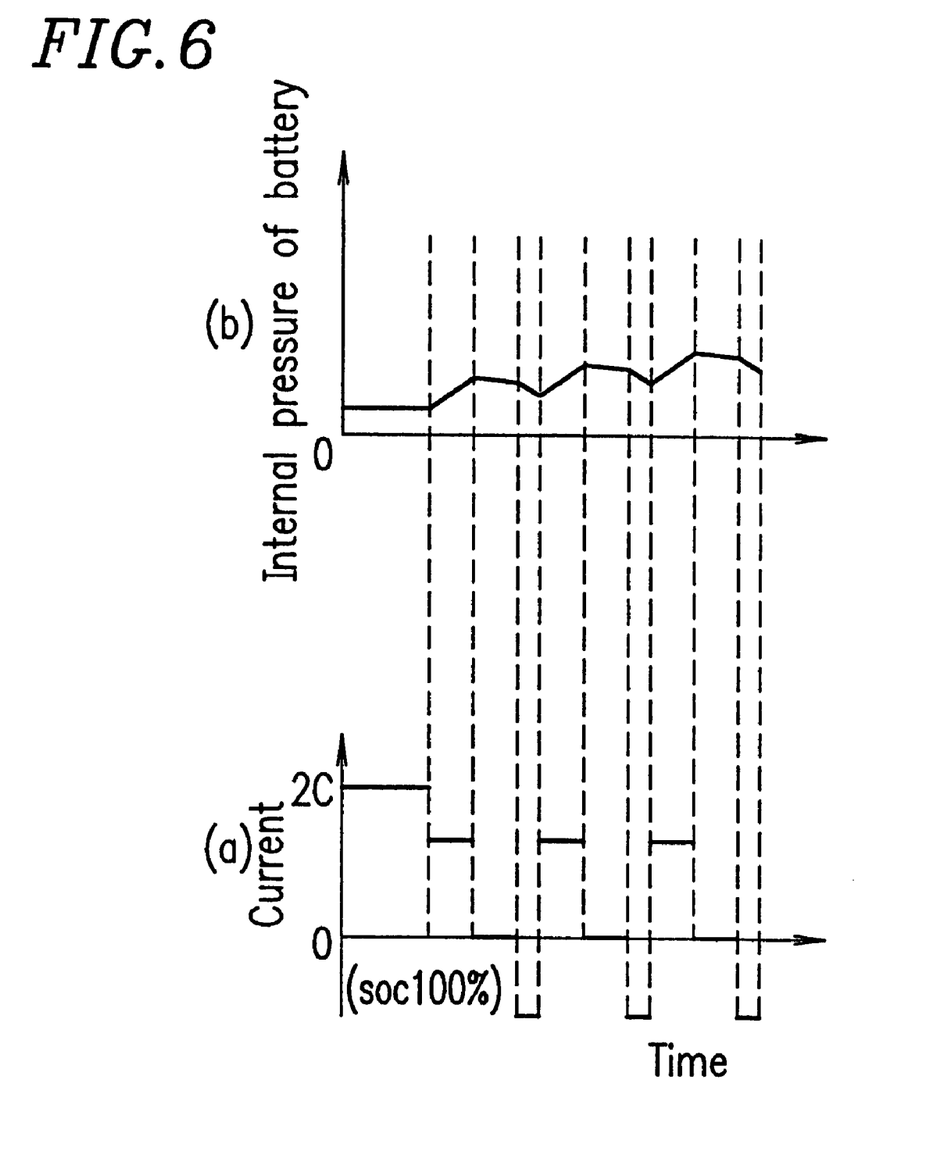

Alternatively, according to the present invention, after the battery pack is charged with a constant current at a rate of 2 C until the remaining battery capacity (SOC) reaches 100%, charging at a low rate of about 0.3–1.5 C, a suspension of charging, and discharging of the battery pack may be repeated in this order as shown in part (a) of FIG. 6. The charging at a low rate, the suspension of charging, and the discharging of the battery pack are each performed for an appropriate time period of about 10 seconds to about 40 minutes. In this case, after the SOC has exceeded 100%, the internal pressure of each battery unit is only increased slowly by the charging at a low rate of about 0.3–1.5 C as shown in part (b) of FIG. 6. Moreover, the internal pressure of each battery unit decreases during the suspension of charging. Furthermore, the internal pressure of each battery unit is surely reduced by the discharging. Thus, by alternately repeating the charging at a low rate of about 0.3–1.5 C, the suspension of charging, and the discharging of the battery pack, an increase in the internal pressure of each battery unit is surely prevented.

The order of the charging at a low rate of about 0.3–1.5 C, the suspension of charging, and the discharging of the battery pack is not limited to the above order. The order of these three steps may be randomly changed.

In the uniform charging method according to each of the above embodiments, the battery pack is charged at a rate of 2 C until the SOC reaches 100%. However, according to the present invention, the battery pack may be charged at a rate different from 2 C. However, when the battery pack is charged at a rate much higher than 2 C, the charging efficiency decreases while the internal pressure of each battery unit increases. When the battery pack is charged at a rate much lower than 1.6 C, the charging time becomes longer. Such a long charging time is not suitable for a battery pack used as a power supply of an electrical motor of a hybrid vehicle or the like. Thus, a rate of about 2 C is preferable. Furthermore, after the remaining battery capacity (SOC) has reached 100%, the lower the value of the charging rate that is set, the more strongly an increase in the internal pressure of each battery unit can be suppressed. However, a lower charging rate requires a longer charging time. Thus, a rate of about 0.3–1.6 C is preferable.

As described above, according to the present invention, during the uniform charging process of a battery pack, an increase in the internal pressure of each battery unit included in the battery pack can be prevented. Thus, in the battery unit including a square-shaped container made of plastic, the need to release gas by opening a safety vent is prevented, and the lifetime of the battery pack is increased. Further, there is no possibility that the pressure endurance limit of the container is reached. Furthermore, in a battery pack formed by combining a plurality of battery units, each having a square-shaped container, an increase in the internal pressure of each battery unit is suppressed, whereby expansion of the container is suppressed. Therefore, it is not necessary to use parts having a high dimensional accuracy for binding the battery units, and accordingly, production costs are kept low.

Figure 7:
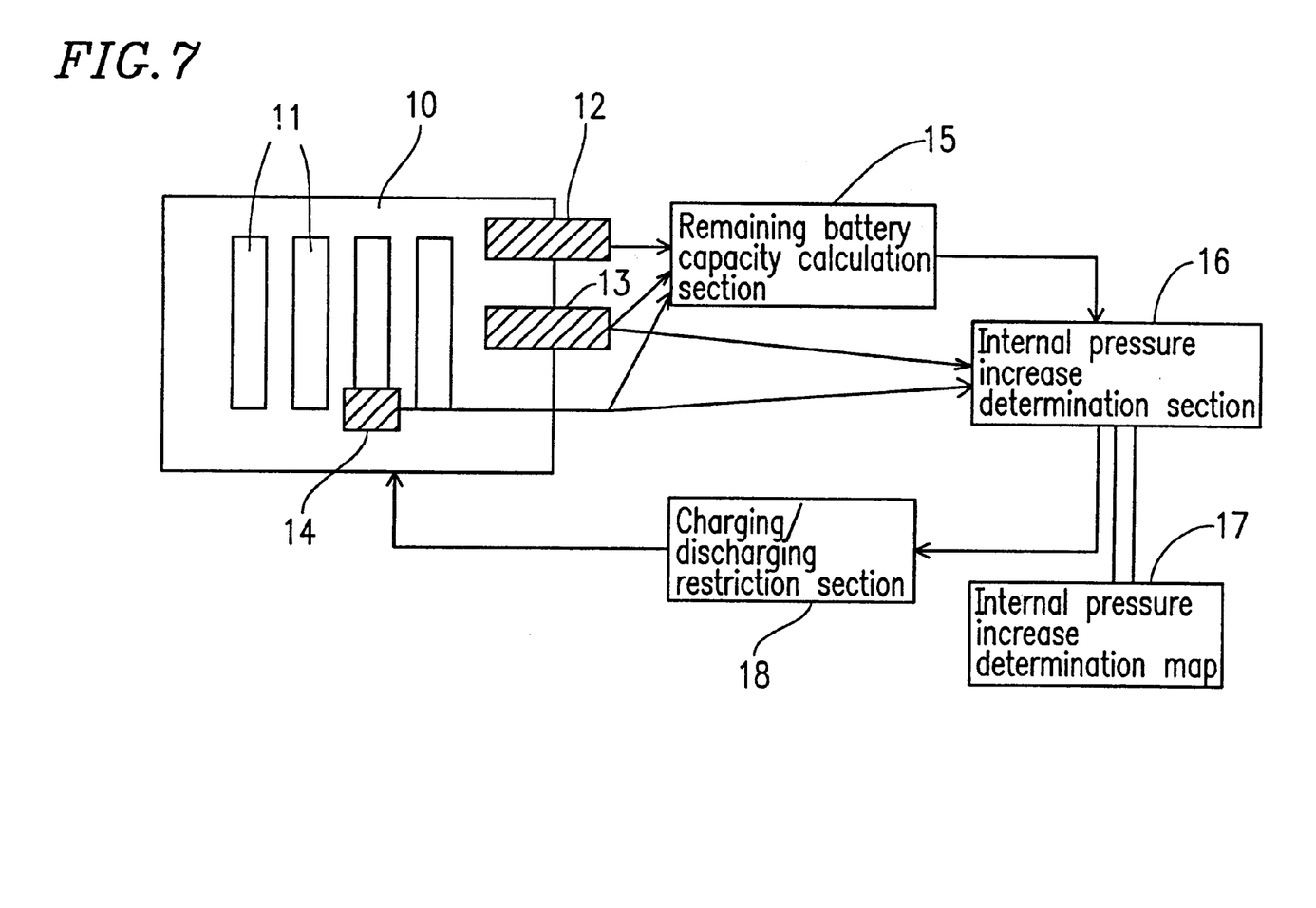
FIG. 7 is a block diagram showing an arrangement of a device used to perform a method for charging the battery pack according to the present invention.

FIG. 7 shows a schematic view of a device for preventing an increase in the internal pressure of a battery pack. The device is used to perform a method for preventing an increase in the internal pressure of a battery pack according to the present invention. This internal pressure increase prevention device is applied to a battery pack 10 formed by combining a plurality of battery units 11 each having a container made of plastic, and determines whether or not the internal pressure of at least one of the battery units 11 is increased. The internal pressure increase prevention device includes: a voltage measurement section 12 for measuring the voltage of any of the battery units 11 included in the battery pack 10; an electric current measurement section 13 for measuring the value of a charged/discharged electric current of the battery unit 11; a temperature measurement section 14 for measuring the temperature of a container of the battery unit 11; a remaining battery capacity calculation section 15; an internal pressure increase determination section 16; an internal pressure increase determination map 17; and a charging/discharging restriction section 18.

The remaining battery capacity calculation section 15 receives outputs of the voltage measurement section 12, the electric current measurement section 13, and the temperature measurement section 14. An output of the remaining battery capacity calculation section 15 is supplied to the internal pressure increase determination section 16. Outputs of the electric current measurement section 13 and the temperature measurement section 14 are also supplied to the internal pressure increase determination section 16. The internal pressure increase determination section 16 determines, using the internal pressure increase determination map 17, whether or not the internal pressure of the battery unit 11 is increased, and outputs a result signal to the charging/discharging restriction section 18. The charging/discharging restriction section 18 restricts charging/discharging of the battery pack 10 based on the result signal from the internal pressure increase determination section 16.

Data of the internal pressure characteristic and data of the pressure endurance characteristic of a plastic container are previously obtained for various types of battery units and recorded as the internal pressure increase determination map 17. In general, the internal pressure characteristic of a battery unit is determined by the remaining battery capacity (SOC), the battery temperature, and the value of a charged/discharged electric current as generally shown by the curves in FIG. 8. As seen from the internal pressure characteristic of the battery unit shown in FIG. 8, the internal pressure of the battery unit is relatively low when the remaining battery capacity of the battery unit is about 20–80%. Moreover, as the temperature or the electric current value increases, the internal pressure of the battery unit increases over a wide remaining battery capacity range.

Figure 9:
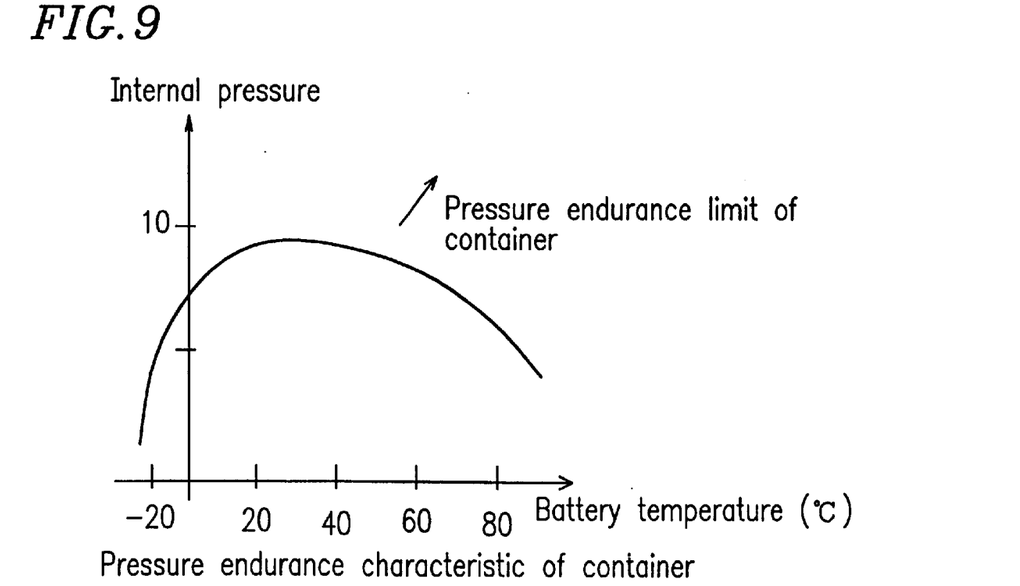
FIG. 9 is a graph showing an example of the pressure endurance characteristic of a container which is stored as a part of an internal pressure increase determination map for use in the device shown in FIG. 7.

In a battery unit 11 which has a plastic container, the pressure endurance characteristic of the plastic container is determined by the internal pressure and the temperature of the battery unit 11 (i.e., the temperature of the container of the battery unit 11) as generally shown by the curve in FIG. 9. As seen from the characteristic shown in FIG. 9, so long as the temperature is in the range of about 20–60° C., even when the internal pressure increases, there is only a small possibility that the pressure endurance limit of the container is reached. However, in a temperature range exceeding 60° C., as the temperature increases, the pressure endurance limit of the container slowly decreases, and accordingly, the pressure endurance limit is reached with a lower internal pressure. Similarly, as the temperature decreases from 20° C., the pressure endurance limit decreases.

Figure 8:
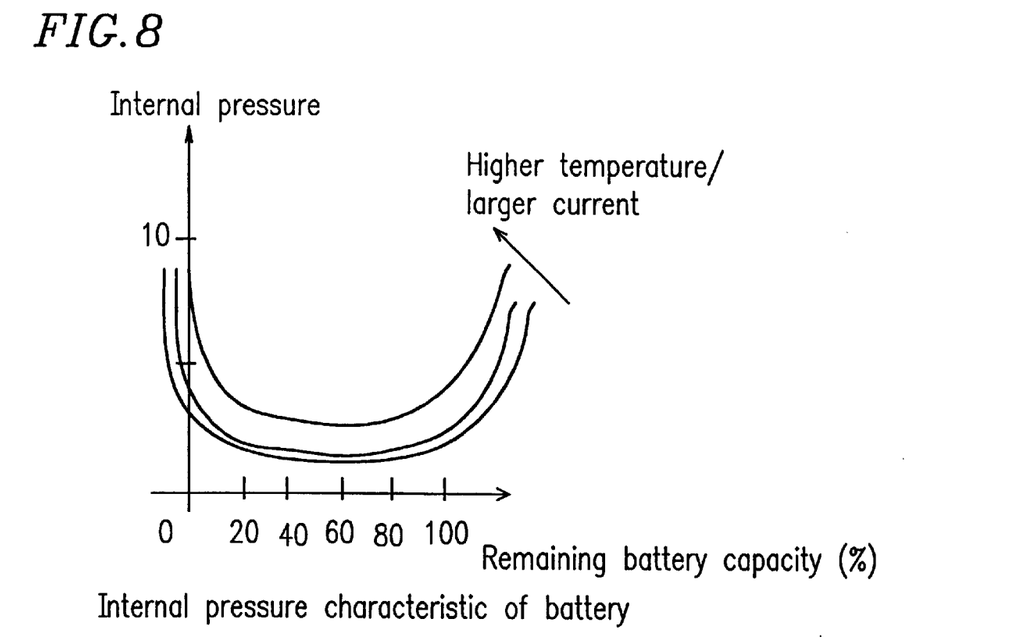
FIG. 8 is a graph showing an example of the internal pressure characteristic which is stored as a part of an internal pressure increase determination map for use in the device shown in FIG. 7.

The graph which represents the internal pressure characteristic of the battery unit shown in FIG. 8 and the graph which represents the pressure endurance characteristic of the container shown in FIG. 9 are recorded as the internal pressure increase determination map 17 in the internal pressure increase determination section 16 (FIG. 7).

Figure 10:
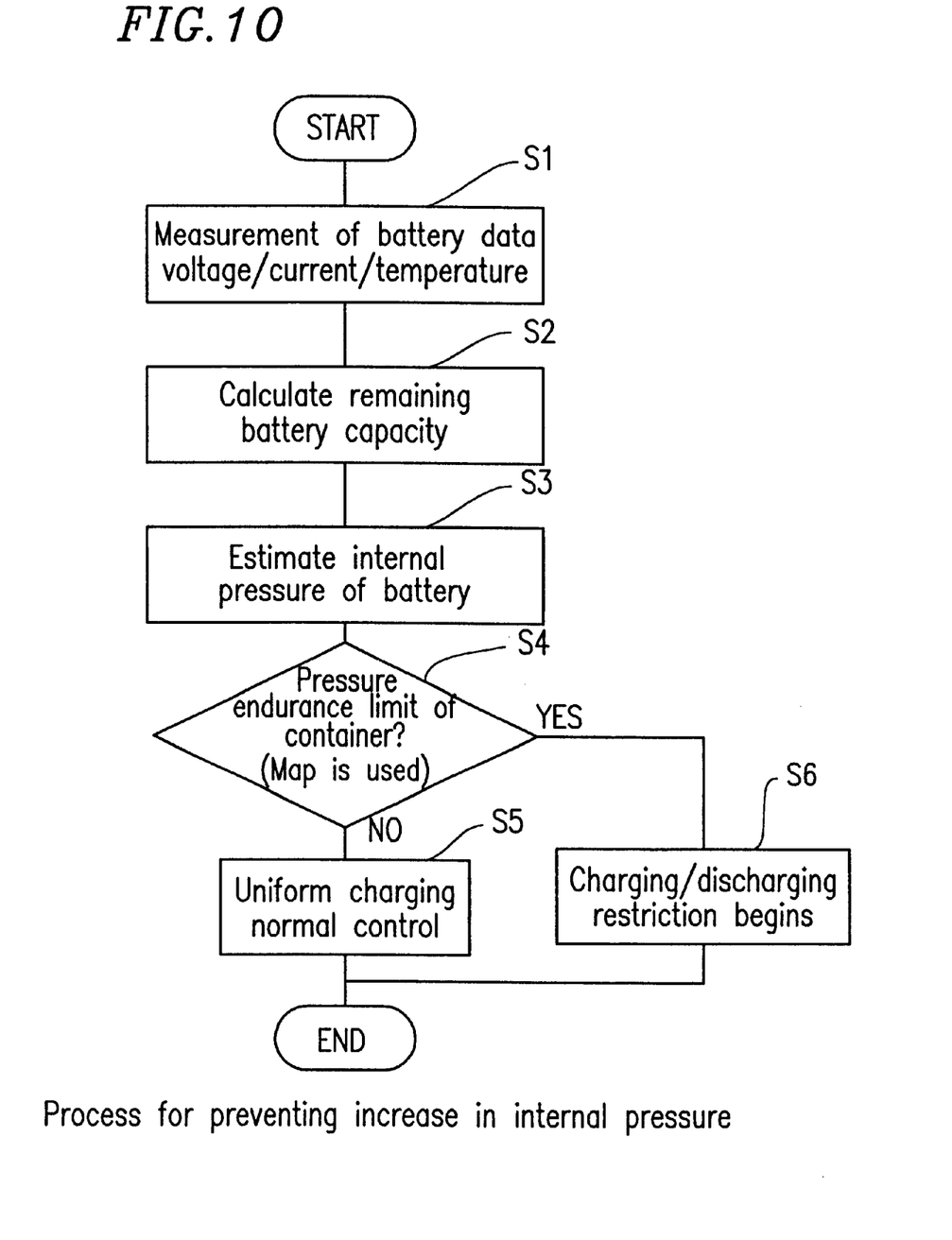
FIG. 10 is a flowchart illustrating an operation of the device shown in FIG. 7.

FIG. 10 is a flowchart illustrating an operation of the internal pressure increase prevention device having the above-described structure shown in FIG. 7. For example, when the battery pack 10 is subjected to a uniform charging process, the internal pressure increase prevention device measures the voltage, electric current, and temperature of a selected battery unit 11 with the voltage measurement section 12, the electric current measurement section 13, and the temperature measurement section 14, respectively (Step S1). The measured voltage, current and temperature of the battery unit 11 are supplied to the remaining battery capacity calculation section 15. The remaining battery capacity calculation section 15 calculates the remaining battery capacity of the battery unit 11 based on the measured voltage, current and temperature of the battery unit 11 (Step S2).

The remaining battery capacity of the battery unit 11 calculated by the remaining battery capacity calculation section 15 is supplied to the internal pressure increase determination section 16. The value of an electric current of the battery unit 11 measured by the electric current measurement section 13 and the value of the temperature of the battery unit 11 measured by the temperature measurement section 14 are also supplied to the internal pressure increase determination section 16. The internal pressure increase determination section 16 estimates the internal pressure of the battery unit 11 based on the calculated remaining battery capacity of the battery unit 11, the measured current value and temperature of the battery unit 11, and the internal pressure increase determination map 17 (Step S3).

Specifically, the internal pressure increase determination section 16 estimates the internal pressure of the battery unit 11 from the graph of FIG. 8 illustrating the internal pressure characteristic of the battery unit 11 based on the remaining battery capacity of the battery unit 11 and the current value and the temperature of the battery unit 11. Then, the internal pressure increase determination section 16 determines whether or not the pressure endurance limit of a container of the measured battery unit 11 has been reached from the graph of FIG. 9 illustrating the pressure endurance characteristic of the container of the battery unit 11 based on the estimated internal pressure and the measured temperature of the battery unit 11 (Step S4).

When the internal pressure of the battery unit 11 is sufficiently below the pressure endurance limit of the container of the battery unit 11 (NO at step S4), normal charging/discharging of the battery pack 10 is performed (Step S5). However, when the internal pressure of the battery unit 11 is below but in the vicinity of the pressure endurance limit of the container of the battery unit 11 (YES at step S4), the internal pressure increase determination section 16 determines that the internal pressure of the battery unit 11 is high and that the pressure endurance limit of the container may be reached, and outputs a result signal which informs the determination result to the charging/discharging restriction section 18. In response to the result signal, the charging/discharging restriction section 18 restricts the charging/discharging of the battery pack 10 (Step S6). In this way, an increase in the internal pressure of all of the battery units 11 included in the battery pack 10 can be prevented, and accordingly, the container of each battery unit 11 is prevented from reaching the pressure endurance limit thereof.

As described hereinabove, when a battery pack is subjected to a uniform charging process, the method for charging a battery pack according to the present invention can prevent an increase in the internal pressure of battery units included in the battery pack. Thus, a container of each battery unit can be prevented from reaching the pressure endurance limit thereof. Moreover, the present invention does not require an expensive and precise internal pressure sensor or the like. Thus, the internal pressure increase prevention device can be achieved at a low production cost while the reliability of the device is improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for charging a battery pack including a plurality of battery units, comprising:
   a first step of charging the battery units with a first electric current at a first rate until an internal pressure of at least one of the plurality of battery units begins to increase; and
   a second step of charging/discharging the battery units with a second electric current which is lower than the first electric current at a second rate which is lower than the first rate after the internal pressure of the at least one of the plurality of battery units has begun to increase.

2. A method for charging a battery pack including a plurality of battery units according to claim 1, wherein the second step includes steps of:
   charging the battery units; and
   suspending the charging/discharging of the battery units.

3. A method for charging a battery pack including a plurality of battery units according to claim 1, wherein the second step includes steps of:

charging the battery units; and discharging the battery units.

4. A method for charging a battery pack including a plurality of battery units according to claim 1, wherein the second step includes steps of:

charging the battery units;

discharging the battery units; and suspending the charging/discharging of the battery units.

5. A method for charging a battery pack including a plurality of battery units according to claim 1, wherein the first rate is 1.6–3.0 C, and the second rate is 0.3–1.5 C.

6. A method for preventing an increase in an internal pressure of a battery pack including a plurality of battery units, comprising steps of:

detecting a temperature of at least one of the battery units;

estimating an internal pressure of the at least one of the battery units;

determining, based on the detected temperature of the at least one of the battery units and the estimated internal pressure of the at least one of the battery units, whether or not there is a possibility that a container of the battery unit will reach a pressure endurance limit thereof; and restricting charging/discharging of the battery pack by performing the second step recited in claim 1 when it is determined that there is a possibility that the container reaches the pressure endurance limit thereof.

7. A method for preventing an increase in an internal pressure of a battery pack including a plurality of battery units according to claim 6, wherein the determination of whether or not there is a possibility that the container will reach the pressure endurance limit thereof is performed using a map which represents the pressure endurance limit which has been previously determined.

8. A method for preventing an increase in an internal pressure of a battery pack including a plurality of battery units according to claim 6, wherein the estimation of the internal pressure of the at least one of the battery units is performed based on a remaining battery capacity (SOC) of the at least one of the battery units, the temperature of the at least one of the battery units, and an amount of charged/discharged electric current to/from the at least one of the battery units.

9. A method for preventing an increase in an internal pressure of a battery pack including a plurality of battery units according to claim 8, wherein the remaining battery capacity (SOC) of the at least one of the battery units is calculated based on a voltage of the at least one of the battery units, the amount of charged/discharged electric current to/from the at least one of the battery units, and the temperature of the at least one of the battery units.

* * * * *